United States Patent [19]
Tanaka et al.

[11] Patent Number: 5,948,292
[45] Date of Patent: Sep. 7, 1999

[54] LASER BEAM MACHINING APPARATUS, FOCUS POSITIONING DEVICE FOR LASER BEAM MACHINING APPARATUS, AND CONVERGED LASER BEAM DIAMETER MEASURING DEVICE

[75] Inventors: Hisao Tanaka; Akaru Usui; Shinji Sato; Hirokazu Miyagawa, all of Nagoya, Japan

[73] Assignee: Mitsubishi Denki Kabushiki Kaisha, Tokyo, Japan

[21] Appl. No.: 09/016,308

[22] Filed: Jan. 30, 1998

[30] Foreign Application Priority Data

Jun. 5, 1997 [JP] Japan .................................. 9-148342

[51] Int. Cl.⁶ .................................................. B23K 26/08
[52] U.S. Cl. ................................ 219/121.82; 219/121.6; 219/121.67; 219/121.84
[58] Field of Search ........................... 219/121.6, 121.67, 219/121.7, 121.75, 121.82, 121.84, 121.63

[56] References Cited

U.S. PATENT DOCUMENTS

| 3,383,491 | 5/1968 | Muncheryan | 219/121.63 |
| 4,031,351 | 6/1977 | Martin | 219/121.67 |
| 4,406,940 | 9/1983 | Tsutsumi | 219/121.79 |
| 4,417,125 | 11/1983 | Tsutsumi | 219/121.82 |
| 5,210,391 | 5/1993 | Yoshie et al. | 219/121.63 |
| 5,213,649 | 5/1993 | Sepavich et al. | 219/121.67 X |
| 5,239,160 | 8/1993 | Sakura et al. | 219/121.82 |

FOREIGN PATENT DOCUMENTS

| 55-33819 | 3/1980 | Japan . | |
| 60-166185 | 8/1985 | Japan . | |
| 61-37393 | 2/1986 | Japan | 219/121.6 |
| 63-303692 | 12/1988 | Japan . | |

*Primary Examiner*—Gregory Mills
*Attorney, Agent, or Firm*—Sughrue, Mion, Zinn, Macpeak & Seas, PLLC

[57] ABSTRACT

The laser machining apparatus according to the present invention holds a plate-formed work W giving tension thereto, and comprises a driver base/a work base driving the work in the axial direction, a converging lens for a laser beam L, a laser machining head moving in a direction in which the laser beam L is focused onto the work, an upper work holding member having a nozzle for laser beam irradiation integrated thereto, a bellows for relatively and displaceably connecting the laser machining head and the upper work holding member in the focusing direction, and a lower fixed base/a highly slippery plate located and fixed at a position corresponding to a center of the nozzle, and the work is held between the upper work holding member and the lower fixed base/a highly slippery plate at a position adjacent to the laser beam machining position.

6 Claims, 11 Drawing Sheets

DISPLACEMENT RATE ←— FOCUS POSITION —→ DISPLACEMENT RATE

FIG.18

LASER BEAM MACHINING APPARATUS, FOCUS POSITIONING DEVICE FOR LASER BEAM MACHINING APPARATUS, AND CONVERGED LASER BEAM DIAMETER MEASURING DEVICE

FIELD OF THE INVENTION

The present invention relates to a laser beam machining apparatus, a focus positioning device and a converged laser beam diameter measuring device each for the laser beam machining apparatus, and more particularly to a laser beam machining apparatus for cutting an extremely thin plate by using assist gas, a focus positioning device and a converged laser beam diameter measuring device each for the laser beam machining apparatus.

BACKGROUND OF THE INVENTION

In machining with a laser beam, a work such as a metal plate is instantly and partially melted, whereby it is possible to execute machining for minute dimensions with higher precision as compared to the press machining and etching machining based on the conventional technology.

In order to minutely machine a work with high precision in a machining method using a laser beam, it is required to finely converge a laser beam through a converging lens, and in actual machining it is essential to converge the laser beam at a point on the work through the converging lens so that a converging point, which is a focus position, is not displaced. The reason for this is that it becomes impossible to execute minute machining with high precision or it becomes impossible to execute machining itself if the focus position is displaced.

Figure 11:
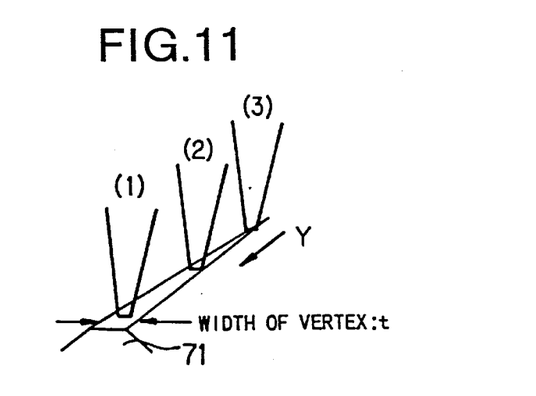
FIG. 11 is a perspective view showing a process of measuring a laser beam diameter using a focus positioning device for a laser beam machining apparatus according to the present invention.

A converging position maintaining apparatus based on the conventional technology for preventing a converging position from being displaced uses, as shown in FIG. 11, a contact-type displacement meter for controlling a distance between the converging lens and the work at a constant value.

Figure 13:
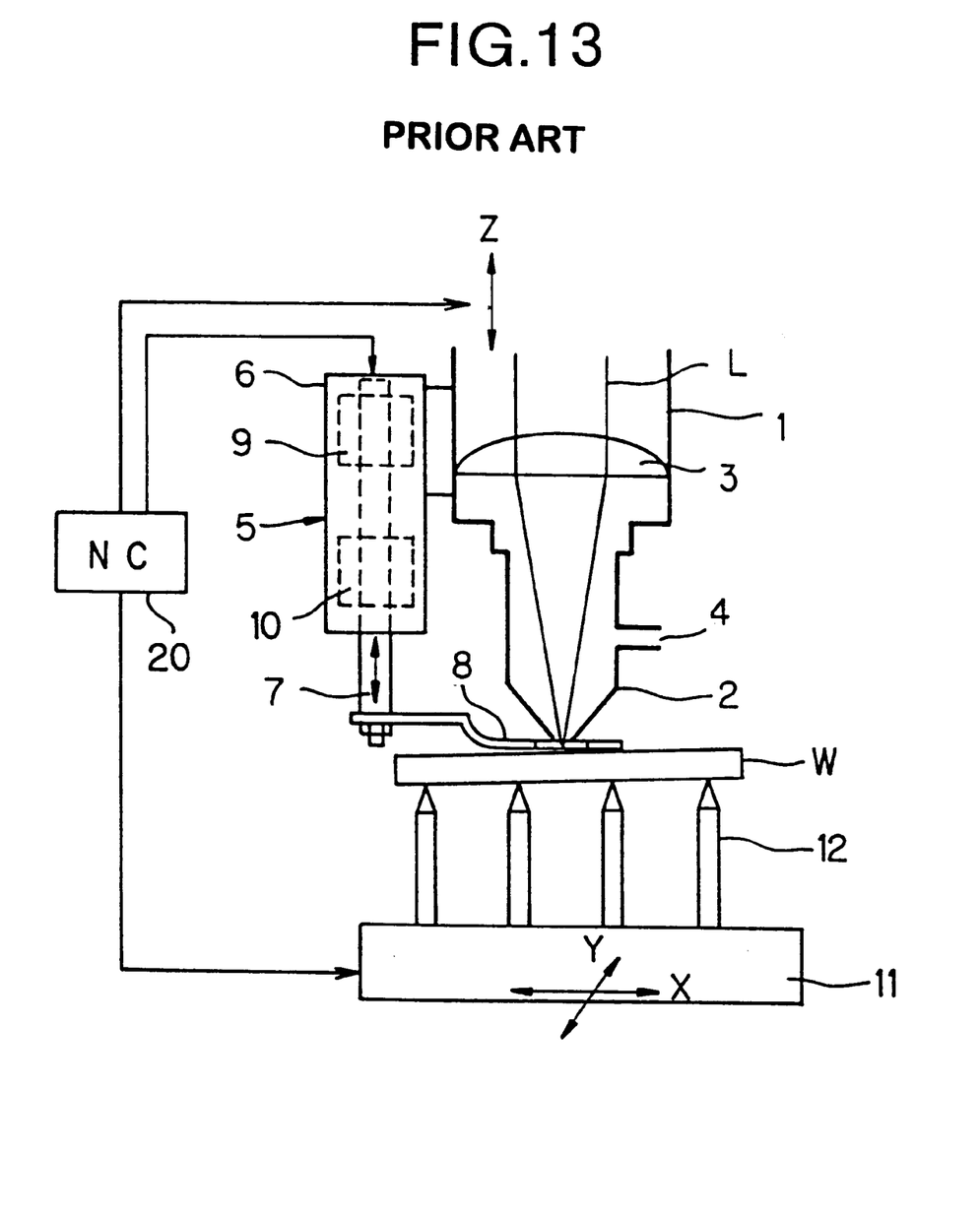
FIG. 13 is a block diagram showing an example of configuration of a laser beam machining apparatus based on the conventional technology.

In FIG. 13, a reference numeral 1 shows a laser machining head, and a nozzle 2 is provided at an end (lower end) of the laser machining head 1.

The laser machining head 1 is cylindrical and has a converging lens 3 therein, and a laser beam L is given into the cylinder by a laser oscillator not shown herein. The laser beam L given to the laser machining head 1 is converged on a top surface of a work W by the converging lens 3 and irradiated onto the work W by the nozzle 2. An assist gas inlet opening 4 is provided in the nozzle 2.

The laser machining head 1 moves in Z axial direction (in the vertical or focusing direction in FIG. 13) by a Z-axial servo motor (not shown in the drawing) driven and controlled by an NC device 20.

A contact-type displacement meter 5 is removably set in the laser machining head 1. The contact-type displacement meter 5 comprises an external case 6 integrated with the laser machining head 1, a movable shaft 7 which is supported by the external case 6 and moves upward and downward, a contact 8 having a form like a plate piece which is fixed at the lower end of the movable shaft 7 and contacts the work W, a shaft driving section 9 for driving the movable shaft 7 upward and downward for pushing the contact 8 against the work W, and a position detecting section 10 for detecting a displacement (position) of the movable shaft 7 in the vertical direction.

The work W is mounted on frog pins 12 provided on a driver base 11 and supported by the frog pins 12 at many points and also at a specified height position.

The driver base 11 is moved in the X-axial direction (leftward and rightward directions in FIG. 13) and Y-axial direction (a direction perpendicular to the plane shown in FIG. 11) by X-axial and Y-axial servo motors (not shown in the drawing) driven and controlled by the NC device 20.

Operations in the conventional method based on the configuration as described above is explained below.

The contact-type displacement meter 5 is removed from the laser machining head 1, the laser machining head 1 is positioned in the Z-axial direction so that the focus position of the laser beam L is positioned on the work W, and a distance between the nozzle 2 and the work W is adjusted.

In this state, the contact-type displacement meter 5 is placed to the laser machining head 1, the contact 8 is contacted with the work W, and a position signal (a signal showing displacement of the movable shaft 7) output from the position detecting section 10 at this point of time is stored as a focus position signal in the NC device 20.

As shown in FIG. 13, when the work W is inclined, the contact 8 moves upward or downward corresponding to a difference in height due to the inclination; this is detected by the position detecting section 10; and the NC device 20 moves the laser machining head 1 (the converging lens 3) upward or downward with the z-axial servo motor (not shown in the drawing) so that positional deviation between a position instructed by a position signal output from the position detecting section 10 and a position instructed by the focus position signal is not generated, in other words, so that the focused state is maintained.

Because of the operations described above, the focus position is maintained at a contact position against the work W even when the work W is inclined.

Figure 15:
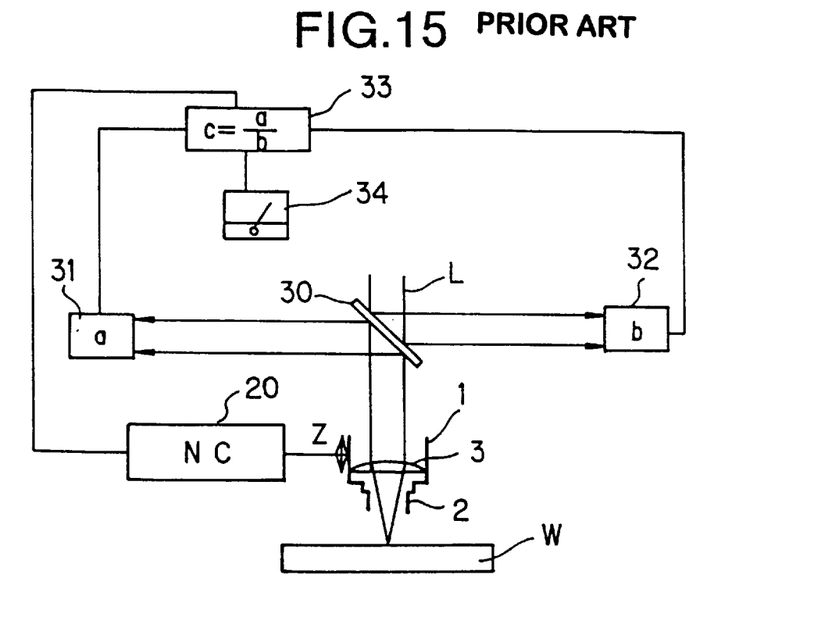
FIG. 15 is a view showing configuration of a focus positioning apparatus for a laser beam machining apparatus based on the conventional technology.

One of preparatory operations of laser beam machining is focusing of a laser beam. As a conventional type of focusing apparatus for focusing a laser beam, the apparatus shown in Japanese Patent Publication No. SHO 60-166185 is known. This focusing apparatus comprises, as shown in FIG. 15, a beam splitter 30 provided at an inclination of 45 degrees in a transmission path of the laser beam L, a first laser intensity sensor 31 and a second laser intensity sensor 32 provided at both sides of the beam splitter 30, a divider 33, and a meter 34.

In this focusing apparatus, a portion of a laser incoming to the work W is guided to the second laser intensity sensor 32 because of a spectral function by the beam splitter 30 and at the same time a portion of light reflected from the work W is guided to the first laser intensity sensor 31; intensity of the laser incoming to the work W is detected by the second laser intensity sensor 32; intensity of the reflected beam (reflected laser beam) from the work W is detected by the first laser intensity sensor 31; a ratio c=a/b wherein a is an output from the first laser intensity sensor 31 and b is an output from the second laser intensity sensor 32 is computed by the divider 33; an output (a ratio c) from the divider 33 is outputted to the meter 34 as a numeric value indicating a focusing degree, and the numeric value indicating a focusing degree is displayed by the meter 34 so that the value can be visually observed quantitively.

Because of this, it becomes possible to execute focusing for seeking a focal point where intensity of the reflected beam from the work W reaches the maximum by irradiating the laser beam L onto the work W and moving the converging lens 3 upward or downward while looking at a display of the focusing degree by the meter 34.

Figure 16A:
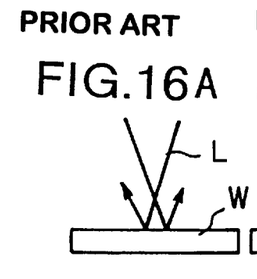
FIG. 16A is an explanatory view showing a defocused state as well as a focused state in focus positioning a focus in the conventional technology.
Figure 16B:
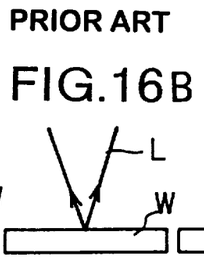
FIG. 16B is an explanatory view showing a defocused state as well as a focused state in focus positioning a focus in the conventional technology.
Figure 16C:
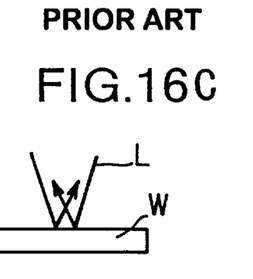
FIG. 16C is an explanatory view showing a defocused state as well as a focused state in focus positioning a focus in the conventional technology.

When the laser beam L is irradiated onto the work W, a portion thereof is reflected. When the laser beam is focused on the work W, the reflected beam becomes parallel to the original laser beam and returns through the transmission path that the laser beam came through as shown in FIG. 16B. On the contrary, in a case where the focal point is off from a right position, as shown in FIG. 16A and FIG. 16C, a portion of the reflected beam does not go back through the transmission path that the laser beam came through, and even if the portion of the reflected beam goes into the converging lens 3, it is scattered so that intensity of the reflected laser beam outputted from the second laser intensity sensor 32 becomes maximum when the focal point is focused at a right position.

Figure 17:
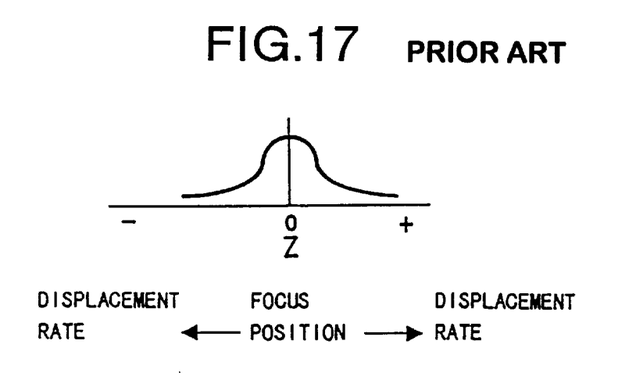
FIG. 17 is a graph showing the focusing degree characteristics in focus positioning in the conventional technology.

Therefore, correlation between displacement from the focal point of the converging lens 3 and output from the divider 33 has the characteristics as shown in FIG. 17, and the output (the ratio c) from the divider 33 becomes maximum at the focus position.

Because of the features described above, when a value from the meter 34 becomes maximum by moving a position of the converging lens 3 upward or downward against the work W, a focus position of the converging lens 3 matches to a top surface of the work W.

In order to execute minute machining with high precision, it is necessary to minimize a diameter of the laser beam by narrowing down the laser beam at a position irradiated by the laser beam on the work W. Conventionally, measurement of the laser beam diameter at the position irradiated by the laser beam on the work W is executed by irradiating the laser beam onto acrylic resin or the like for machining to make a hole and measuring a diameter of the perforated hole with an appropriate measuring instrument.

Figure 14:
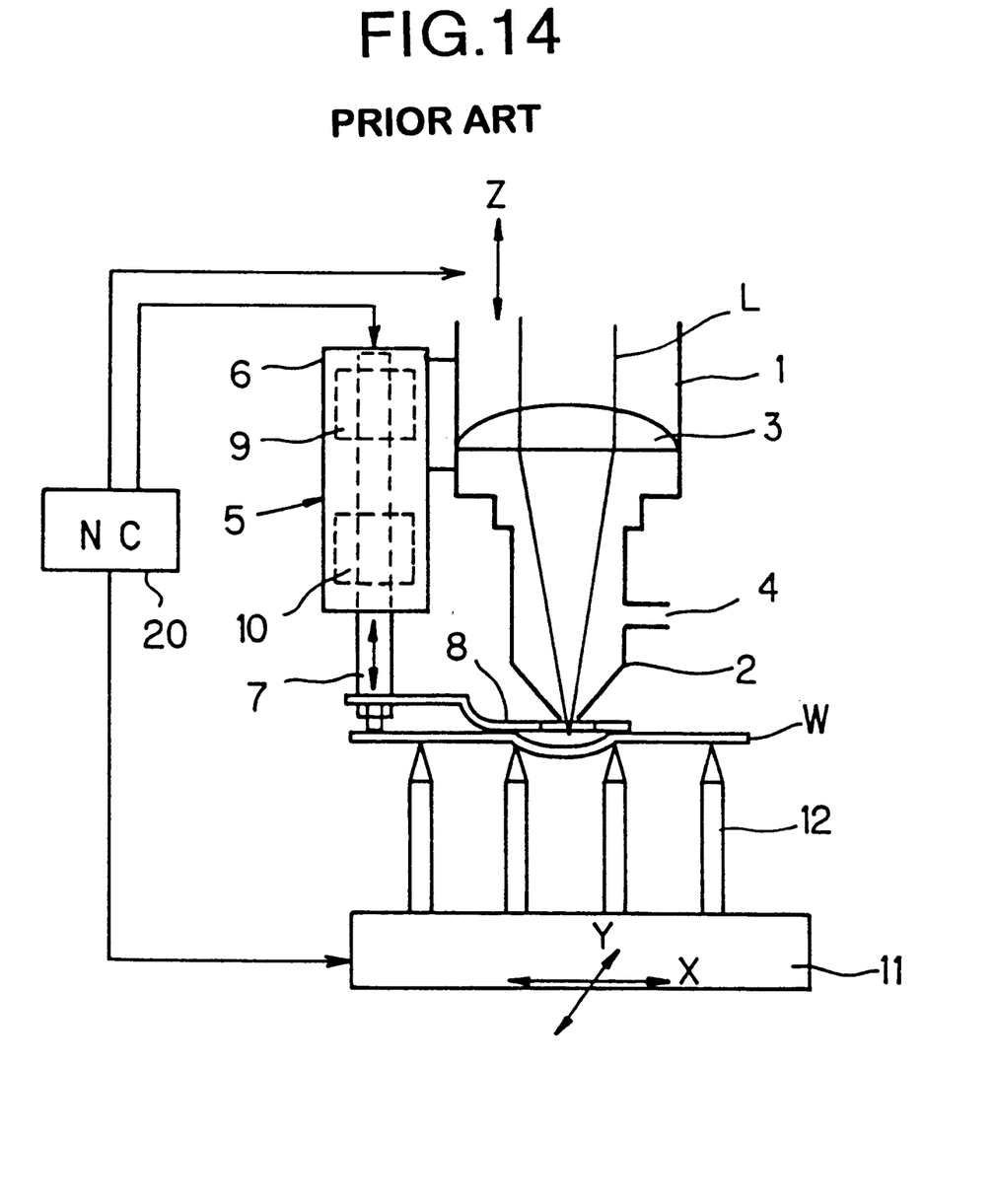
FIG. 14 is an explanatory view showing a state of machining an extremely thin plate by using the laser beam machining apparatus based on the conventional technology.

In a case where machining with a laser beam is executed, generally a laser beam L is irradiated onto a work W, and at the same time an assist gas is injected in the same axial direction as that of the laser beam L for promoting combustion of a portion of the work to be machined or for suppressing dross formed on a rear surface of the work by blowing off melted material generated thereon, and for this reason, with a converging position maintaining apparatus based on the conventional technology as described above, if a work W is a extremely thin plate, the extremely thin plate is bent downward at a machining position from the standard position for irradiation of laser beam because of pressure of injected assist gas as shown in FIG. 14, which makes it unstable or even impossible for a contact 8 of a contact-type displacement meter 5 to follow the work W at the machining position.

As a result, a focus position does not exist on the extremely thin plate, and minute machining with high precision cannot be executed, and in an extreme case machining itself becomes impossible.

Also, with the converging position maintaining apparatus based on the conventional technology as mentioned above, it is necessary for the contact-type displacement meter 5 to be attached to or removed from the machining head 1 in a focus positioning operation, which makes the work complicated and requires a disadvantageously long period of time for the work.

Figure 18:
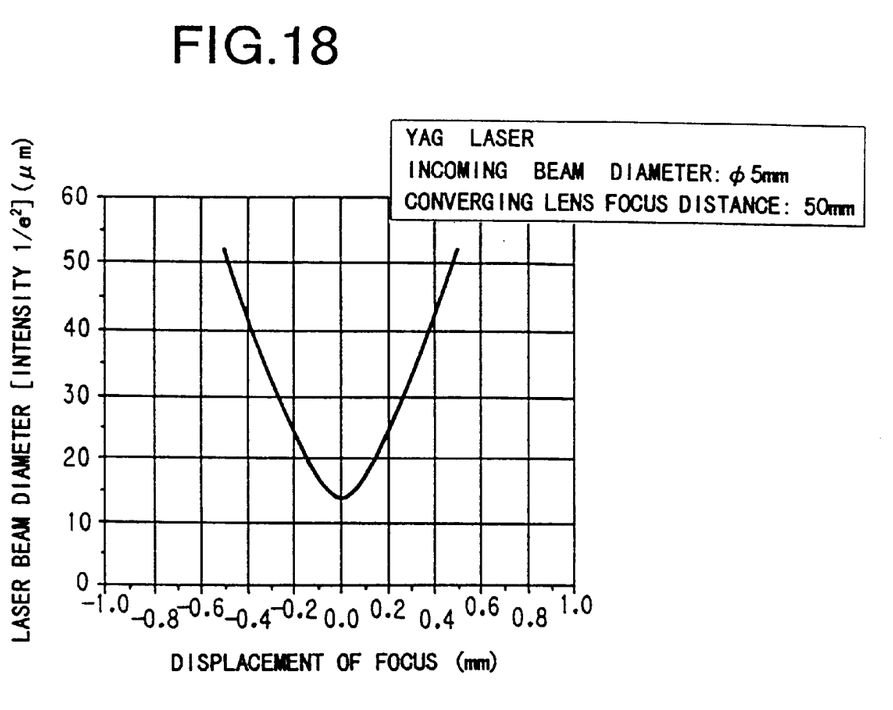
FIG. 18 is a graph showing correlation between a laser beam diameter and displacement of a focus.

A converged laser beam diameter is proportional to a cutting machining width, so that it is essential for executing minute machining with the laser beam to minutely converge the laser beam. FIG. 18 shows correlation (a computed value) between a displacement from a focus position and the converged laser beam diameter in a case where a YAG laser beam is converged by a lens with a focal distance of 50 mm. It can been seen from this figure that even a slight displacement largely changes a diameter of a converged laser beam.

However, focus positioning based on the conventional technology is executed according to a ratio of intensity of a reflected light from a surface of a flat-shaped work W with relatively loose change in intensity of a reflected light vs. an incoming beam thereto, so that it is difficult to execute focus positioning with high precision even in an operation for focus positioning while looking at a value of a meter 34.

In laser beam diameter measurement for measuring a diameter of a converged laser beam diameter by irradiating the laser beam onto acrylic resin or the like to make a hole and measuring a diameter of the perforated hole, only an intermittent measuring result can be obtained for a displacement from the focus position, and it is impossible to execute measurement with high precision. Also, use of materials such as acrylic resin and the like are rather wasteful.

SUMMARY OF THE INVENTION

It is an object of the invention to provide a laser beam machining apparatus which enables to stably execute minute machining with high precision without changing a focus position due to pressure by an injected assist gas even in a case where a work is an extremely thin plate as well as to execute focus positioning without removing a contact-type displacement meter from a machining head; a focus positioning device which enables to easily execute focus positioning with high precision so that minute laser beam machining can be executed; and a converged laser beam diameter measuring device which enables to execute precise measurement of a converged laser beam diameter.

With the laser beam machining apparatus according to the invention, the work is held between the upper work holding member and the lower fixed base at a position adjacent to the laser beam machining position, and the work is not swayed even if an assist gas is injected thereto, thus converged state of a laser beam on the work is maintained in good condition.

With the laser beam machining apparatus according to the present invention, melted material generated in cutting is blown away from the tapered throughhole to a rear side of the work by pressure of the assist gas without generating any interference to an inside wall of the hole.

With the laser beam machining apparatus according to the present invention, an assist gas blown against a laser beam machining section flows from a slit to the outside.

With the laser beam machining apparatus according to the present invention, movement of the work is executed with low frictional resistance and without generating any scratch to the work.

With the laser beam machining apparatus according to the present invention, the work rotates and changes its position in association with rotation of the rotary driver base.

With the laser beam machining apparatus according to the present invention, a pair of winding/extending tension rollers gives a tensile force with specified strength to work between the rollers and moves the work by means of synchronous driving of the rollers in the axial direction.

With the focus positioning device for a laser beam machining apparatus according to the present invention, a change of a reflected beam due to displacement from the focus position becomes larger because focus positioning is performed at a vertex of the projecting stripe.

With the converged laser beam diameter measuring device for a laser beam machining apparatus according to the present invention, it is possible to measure a laser beam diameter by scanning irradiation of a laser beam at a vertex of a projecting stripe by checking a focused state at the vertex and checking change in amplitude of the reflected laser beam.

Other objects and features of this invention will become understood from the following description with reference to the accompanying drawings.

DESCRIPTION OF THE PREFERRED EMBODIMENTS

Next detailed description is made for the preferred embodiments of a laser beam machining apparatus, a focus positioning device for a laser beam machining apparatus, and a converged laser beam diameter measuring device for a laser beam machining apparatus each according to the present invention with reference to the attached drawings. It should be noted that, in the embodiments described hereinafter, portions having same configuration as those based on the conventional technology described above have same reference numerals as those used in description of the example based on the conventional technology, and description thereof is omitted herein.

Figure 1:
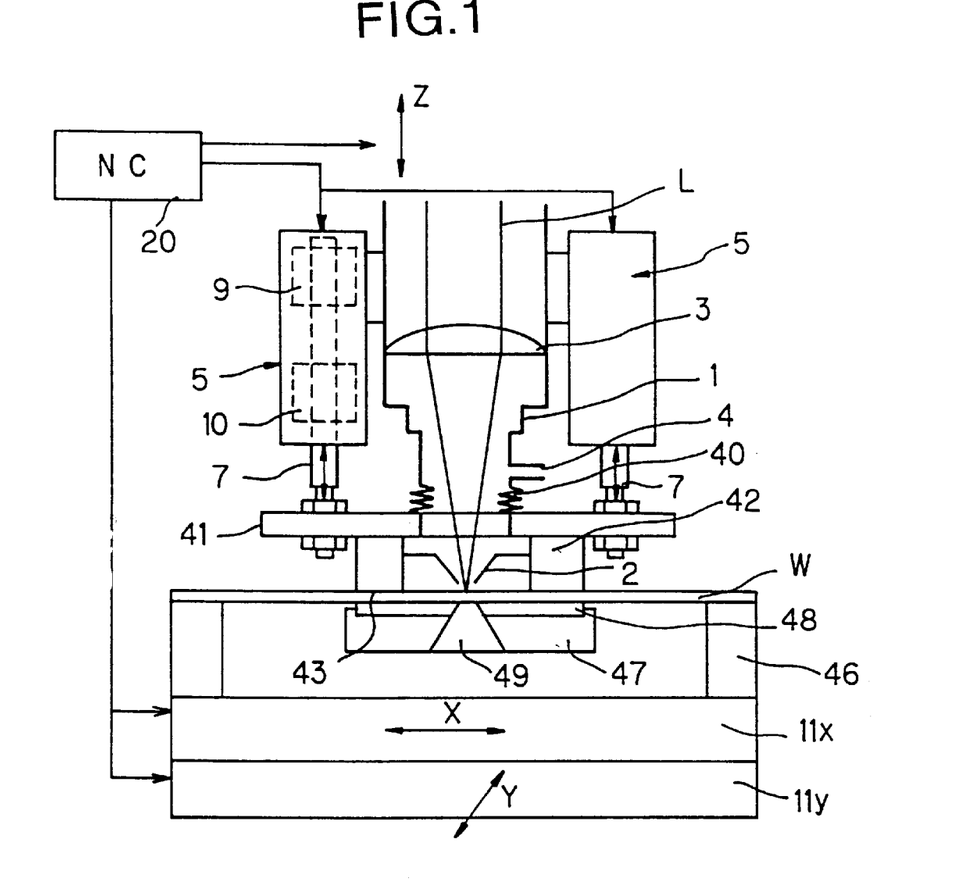
FIG. 1 is a view showing configuration of a laser beam machining apparatus according to Embodiment 1 of the present invention.
Figure 2:
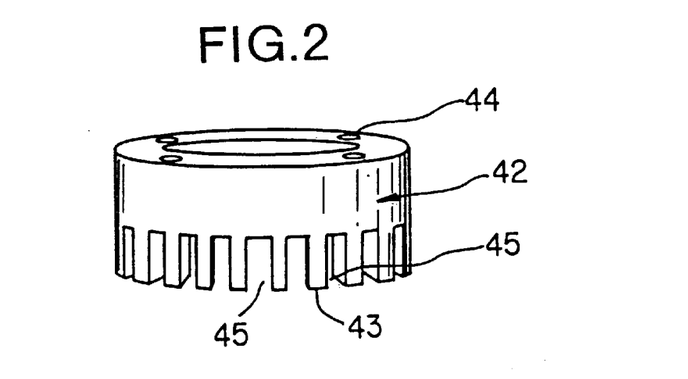
FIG. 2 is a perspective view showing an upper work holding member used in a laser beam machining apparatus according to the present invention.

FIG. 1 shows a laser beam machining apparatus according to Embodiment 1 of the present invention. This laser beam machining apparatus comprises a cylindrical bellows 40 at an edge of a machining head 1, and a connecting plate 41 is connected to the bellows 40 so that it can change its position in the vertical direction (the focusing direction). The connecting plate 41 comprises an upper work holding member 42 fixed on the bottom surface of the connecting plate. The upper work holding member 42 is made from a surface material with high slipperiness such as fluorocarbon resin, has a cylindrical form looking like a cup placed upside down as shown in FIG. 2, and comprises a substantially horizontal bottom surface as a work holding surface (a surface facing to a work W) 43, a set bolt insertion hole 44 provided in the upper surface section, and a plurality of slits 45 for exhausting assist gas provided in the peripheral section. Each of the slits 45 is discretely opened to the work holding surface 43.

In other words, the bellows 40 is a hollow telescopic contact member and connects the laser machining head 1 and the upper work holding member 42 so that they can change their relative positions to each other in the focusing position.

A nozzle 2 is fixed inside the upper work holding member 42. Because of this feature, a distance between an end position of the nozzle 2 and the work holding surface 43 is kept at a constant value.

It should be noted that an assist gas inlet port 4 is provided in the laser machining head 1 in place of the nozzle 2. Even if the assist gas inlet port 4 is provided in the laser machining head 1 in place of the nozzle 2, the assist gas is injected from the tip of the nozzle 2 to the laser machining section substantially like in a case where the assist gas inlet port 4 is provided in the nozzle 2.

In FIG. 1, the laser machining head 1 comprises a pair of contact-type displacement meters 5 each provided to both right side and left sides of the laser machining head respectively. The pair of contact-type displacement meters 5 hold the connecting plate 41 almost horizontally instead of a contactor 8, and detect a height position of the connecting plate 41.

A work base 46 is provided on a work table comprising a Y-axial driver base 11y and an X-axial driver base 11x. The work base 46 holds a peripheral section of the work W comprising an extremely thin plate to give a tensile force to the work W and tenses and holds the work W in the substantially horizontal posture.

A lower fixed base 47 is provided at a central position of the nozzle 2, namely at a position corresponding to the laser beam machining position. The lower fixed base 47 is located and fixed above the X-axial driver base 11x by a supporting mechanism (not shown in the drawing) so that it would not give interference to movement of the Y-axial driver base 11y nor to that of the X-axial driver base 11x, and horizontally holds the work W by supporting a specified area of a bottom surface (a rear surface) of the work W with a highly slippery plate 48 made from fluorescent or the like.

A tapered throughhole 49 is provided at positions irradiated by a laser beam on the lower fixed base 47 and the highly slippery plate 48. The tapered throughhole 49 comprises a tapered hole widening in a direction opposite to the side irradiated by the laser beam, namely the bottom side.

Next description is made for operations in Embodiment 1 with the configuration as described above.

At first, the work W is placed on the work base 46, and is tensed and held in the substantially horizontal posture by the work base 46.

Next, the work holding surface 43 of the upper work holding member 42 is pressed against a top surface of the work base 46, the work W is held by the upper work holding member 42 and the highly slippery plate 48 of the lower fixed base 47 from both the top and bottom sides at a position adjacent to the laser beam machining position, and in this state the laser machining head 1 is positioned in the Z-axial direction so that a focal point of a laser beam L is positioned on the work W.

In this focus positioning operation, positions of the connecting plate 41, the upper work holding member 42 and the nozzle 2 are not changed in the Z-axial direction, and only the laser machining head 1 moves along with a converging lens 3 in the Z-axial direction in association with extension and contraction of the bellows 40.

It should be noted that a gap between the tip of the nozzle 2 and the work W is uniformly decided according to a gap between the tip position of the nozzle 2 and the work holding surface 43, and is not changed even if the laser machining head 1 moves along with the converging lens 3 for focus positioning; and for this reason it is not necessary to adjust the gap.

In a state where the focus positioning is completed, a position signal (a displacement signal) outputted from a position detecting section 10 in the contact-type displacement meter 5 is stored in an NC device 20 as a focus position signal, and when laser beam machining is to be executed afterwards, the laser machining head 1 is moved upward and downward by a servo motor (not shown in the drawing) in the Z-axial direction so that an value of the output signal from the position detecting section 10 becomes equal to the stored value; in other words, so that a focusing state is maintained.

When the laser beam machining is executed, the laser beam L is irradiated from a tip of the nozzle 2 onto the work W according to an instruction from the NC device 20, and at the same time the assist gas supplied in the laser machining head 1 from the assist gas inlet port 4 is injected onto a laser beam irradiated section of the work W, and the X-axial driver base 11x and the Y-axial driver base 11y move respectively in the X-axial direction and Y-axial direction according to cut form data previously set in the NC device 20, whereby the work W fixed on the work base 46 with a tensile force is cut into a specified form.

When this cutting is executed, the work W is held between the upper work holding member 42 and the highly slippery plate 48 of the lower fixed base 47 at a position adjacent to the laser beam machining position, so that the work W is not swayed even if an assist gas is injected thereto, converging state of a laser beam on the work W is maintained in good conditions, and a focus position exists on the work W, which makes it possible to execute minute machining with high precision.

The upper work holding member 42 is made from a surface material with high slipperiness such as fluorescent, and the work W is held by the highly slippery plate 48 of the lower fixed base 47, so that movement of the work W in the X-axial direction and Y-axial direction in a state where the work is held between the upper work holding member 42 and the highly slippery plate 48 of the lower fixed base 47 is smoothly executed with low frictional resistance and without giving any scratch to the work W.

The assist gas injected onto the work W from the nozzle 2 flows out to the outside from a slit 45 of the upper work holding member 42, so that the upper work holding member 42 is not raised up due to pressure of the assist gas, and as a result, the assist gas is injected under stable conditions to the laser machining section on the work W regardless of whether a machined hole or the like exists or not.

Also, the tapered throughhole 49 of the lower fixed base 47 and the highly slippery plate 48 is a tapered hole widening in a direction opposite to a side irradiated by a laser beam, and for this reason melted substance (dross) generated during cutting are blown away from the tapered throughhole 49 to a rear side of the work W by pressure of the assist gas without giving any interference to an inside wall of the hole, thus suppression of dross generated at the rear side of the work W being effectively executed.

With this laser beam machining apparatus, the focus positioning operation can be executed without having the contact-type displacement meter 5 removed from and attached to the laser machining head 1.

Connection of the laser machining head 1 to the connecting plate 41, upper work holding member 42, and nozzle 2 is not always executed with the bellows 40, and it may be executed by a hollow extension mechanism such as a telescopic mechanism (a nesting mechanism).

Figure 3:
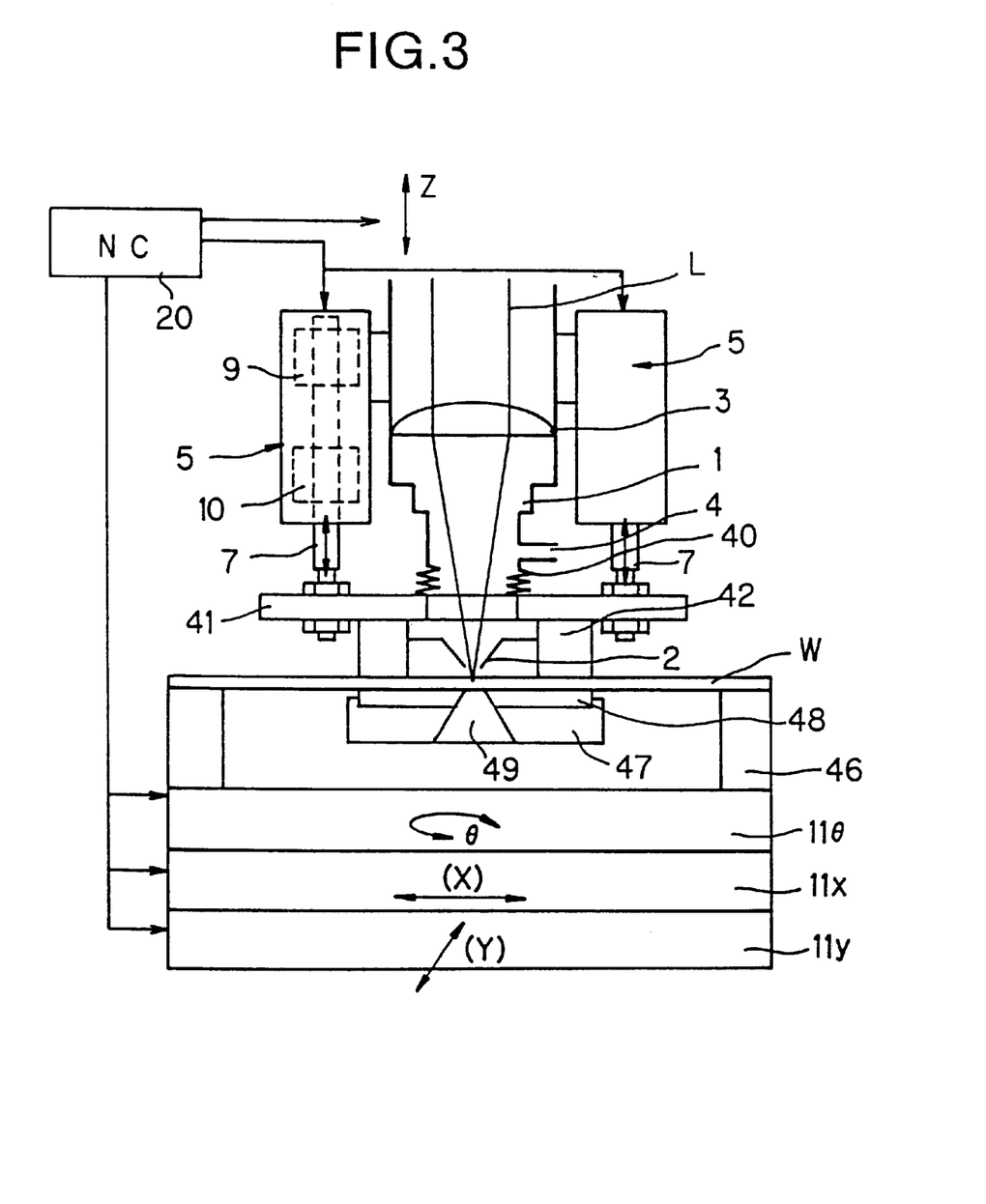
FIG. 3 is a view showing configuration of a laser beam machining apparatus according to Embodiment 2 of the present invention.

FIG. 3 shows a laser beam machining apparatus according to Embodiment 2 of the present invention. It should be noted that, in FIG. 3, the same reference numerals as those used in FIG. 1 are assigned to portions corresponding to those in FIG. 1 portions corresponding to FIG. 1, and description thereof is omitted herein. In this embodiment, a work table (a driver base) comprises a rotary driver base 11 θ rotating around its own central axis in addition to the Y-axial driver base 11y and X-axial driver base 11x, and the rotary driver base 110 is rotated by a θ-axial servo motor (not shown in the drawing) that is controlled and driven by the NC device 20.

Figure 4A:
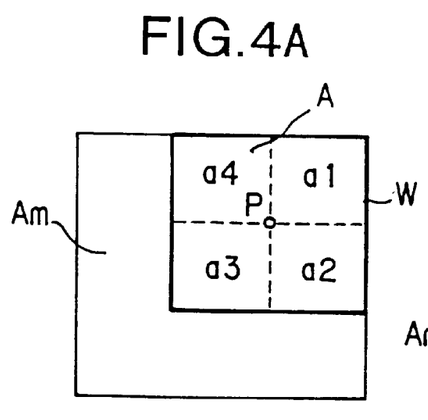
FIG. 4A is a top view showing a process of moving a work for positioning in Embodiment 2.

As shown in FIG. 4A, the work W is a square plate having an area of A, and is tensed and held in the substantially horizontal posture by the work base 46 like in a case of Embodiment 1. Here, the entire work W is fixed on the work base 46, and the entire surface of the work W functions as a machining area, so that an area of the machining area is equal to A. In FIG. 4A, a point P is a position irradiated by a laser beam and is located at a center of the machining area.

Next description is made for an operation for moving the work W in the axial direction by the work table having the rotary driver base.

1) As shown in FIG. 4A, the Y-axial driver base 11y and X-axial driver base 11x are moved to the laser irradiating position P within the area Am to machine an area a1to be machined of the work W.

Figure 4B:
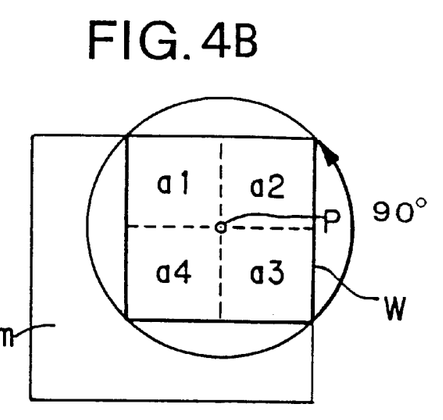
FIG. 4B is a top view showing a process of moving a work for positioning in Embodiment 2.

2) As shown in FIG. 4B, when machining of the area a1 to be machined is completed, the rotary driver base 11 θ is rotated by 90 degrees on the laser irradiating position P as an axis.

3) Machining data is rotated by 90 degrees, and the Y-axial driver base 11y and X-axial driver base 11x are moved to the laser irradiating position P within the area Am to machine a area a2 to be machined of the work W.

4) By following the steps described above, the rotary driver base 11 θ is rotated by 90 degrees, and an machining areas a3 and a4 each to be machined are machined.

With the operation 4) above, machining of all areas is completed.

Figure 4C:
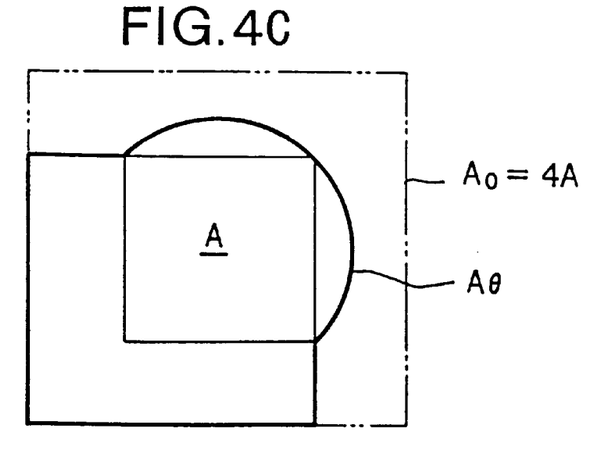
FIG. 4C is a top view showing a process of moving a work for positioning in Embodiment 2.

As shown in FIG. 4C, in a case of a work having a machined area of A and a square form (a length to width ratio=1:0), if driving is executed in only the X-axial and Y-axial directions, a moving area is required to be 4 times larger than an area A of the work, namely the moved area Ao=4A, but if the work is rotated by 90 degrees by the rotary driver base 11 θ, the moved area Aθ=2.54A, which means that the moved area is reduced. Because of this feature, it is possible to reduce an occupied floor space required for laser beam machining.

Figure 5:
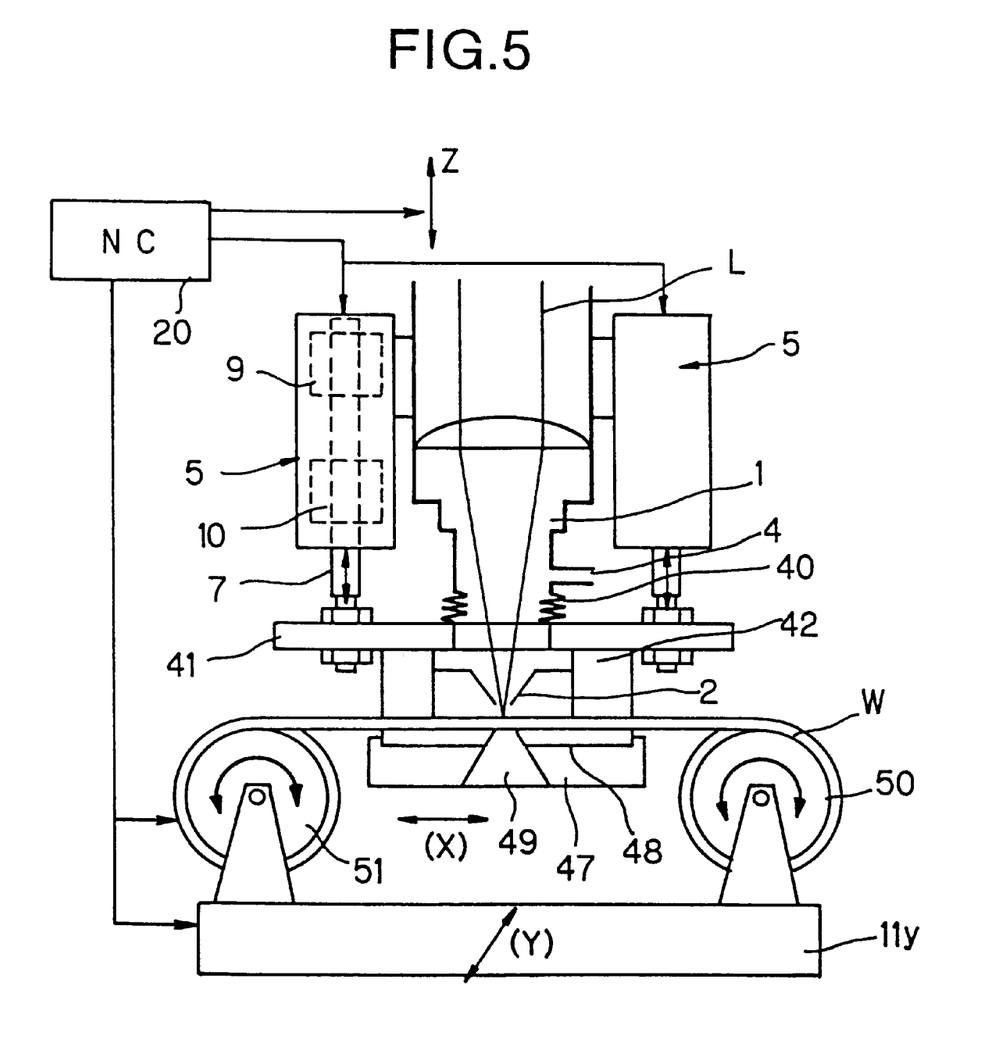
FIG. 5 is a block diagram showing configuration of a laser beam machining apparatus according to Embodiment 3 of the present invention.

FIG. 5 shows a laser beam machining apparatus according to Embodiment 3 of the present invention. It should be noted that, also in FIG. 5, the same reference numerals as those used in FIG. 1 are assigned to portions corresponding to those in FIG. 1, and description thereof is omitted herein. In this embodiment, the X-axial driver base 11x and the work base 46 on the work table (the driver base) are omitted, and winding/extending tension rollers 50 and 51 are provided at both sides of the Y-axial driver base 11y.

The winding/extending tension rollers 50 and 51 are engaged with both ends of a stripped-state to give a tension with prespecified strength to the work between the rollers, and the work W is moved in the X-axial direction when the winding/extending tension rollers 50 and 51 are synchronously driven by the X-axial servo motor (not shown herein) which serves as one of controlling shafts for the NC device 20, so that movement of the work in the axial direction like that by the X-axial driver base is achieved.

In this embodiment, operations are executed like in a case of Embodiment 1 except that the work W is moved in the X-axial direction by means of synchronous driving with the winding/extending tension rollers 50 and 51, and when a cutting operation is executed, the work W is held between the upper work holding member 42 and the highly slippery plate 48 of the lower fixed base 47 at a position adjacent to the laser beam machining position, whereby the work W is not swayed even if an assist gas is injected thereto, converged state of a laser beam on the work W is maintained in good conditions, and a focus position is kept on the work W, which makes it possible to execute minute machining with high precision.

With this laser beam machining apparatus, it is possible to reduce size of an apparatus in the X-axial direction.

Figure 6:
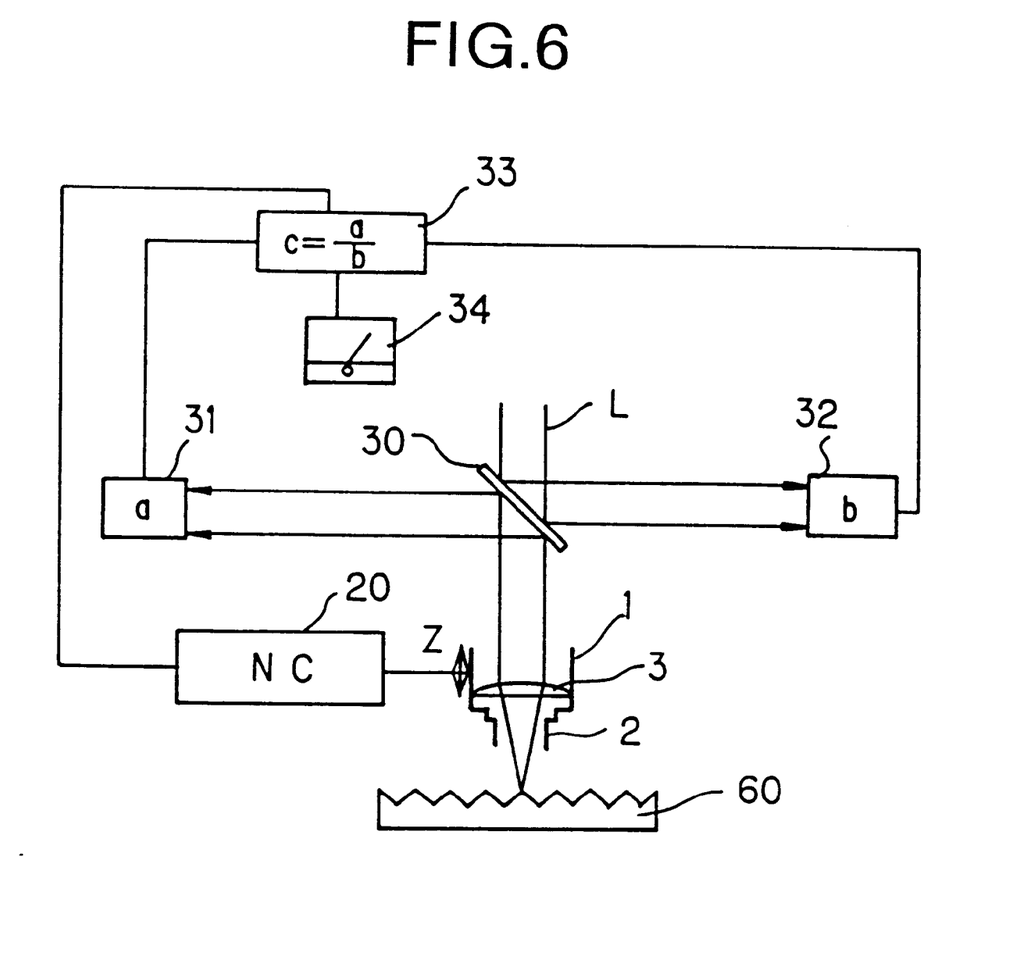
FIG. 6 is a block diagram showing configuration of a focus positioning apparatus using a focus positioning device for a laser beam machining apparatus according to one embodiment of the present invention.

FIG. 6 shows a focus positioning apparatus using a focus positioning device for a laser beam machining apparatus according to one embodiment of the invention. It should be noted that, in FIG. 6, the same reference numerals as those used in FIG. 15 are assigned to portions corresponding to those in FIG. 15, and description thereof is omitted herein.

A focus positioning device 60 is made from a highly reflective material such as metal with silver color, and is placed on a surface for loading a work instead of the work when a focus positioning operation is to be executed.

Figure 7:
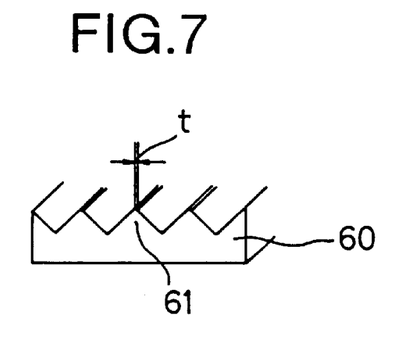
FIG. 7 is a perspective view showing a focus positioning device for a laser beam machining apparatus according to one embodiment of the present invention.

As well shown in FIG. 7, the focus positioning device 60 comprises at least one projecting stripe 61 with a cross-section like a trapezoid and with width of its vertex t smaller than a diameter of a laser beam at a focus position.

Next description is made for a step of positioning a focus with the focus positioning device 60.

1) At first, the focus positioning device 60 is loaded on a specified surface for loading a work, and a center of an area irradiated by a laser beam L is matched to the vertex of the projecting stripe 61 of the focus positioning device 60.

2) Like the example based on the conventional technology, the laser machining head 1 is moved in the Z-axial direction together with the converging lens 3, and a ratio c of an output a from a first laser intensity sensor 31 vs. an output b from a second laser intensity sensor 32, c=a/b, is computed by a divider 33 to obtain a focusing degree (a ratio c).

Figure 8A:
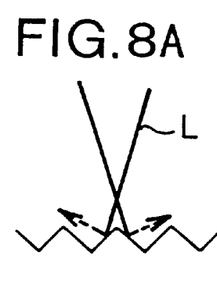
FIG. 8A is an explanatory view showing a defocused state in the focus positioning device.
Figure 8B:
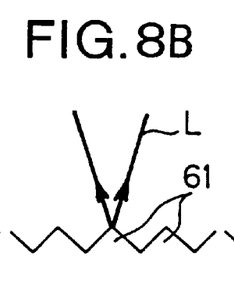
FIG. 8B is an explanatory view showing a defocused state in the focus positioning device.

FIG. 8B shows a state where the focus position has been matched to the vertex of the projecting stripe 61, and only in this case, a reflected beam becomes parallel to the original beam and goes backward in the transmission path that the laser beam previously came through, and in this case intensity of the reflected beam detected by the first laser intensity sensor 31 becomes maximum, and also the focusing degree (the ratio c) becomes maximum.

Figure 8C:
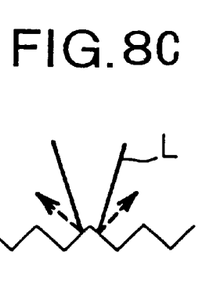
FIG. 8C is an explanatory view showing a defocused state by the focus positioning device.

On the contrary, as shown in FIG. 8A and FIG. 8C, when the focus position is displaced from the vertex of the projecting stripe 61, even if the displacement is slight, most of the laser beam is irradiated onto a tilted surface of the projecting stripe 61 and its reflected beam almost goes off from the incoming optical path, so that the intensity of the reflected beam detected by the first laser intensity sensor 31 is drastically reduced down to almost zero.

Figure 9:
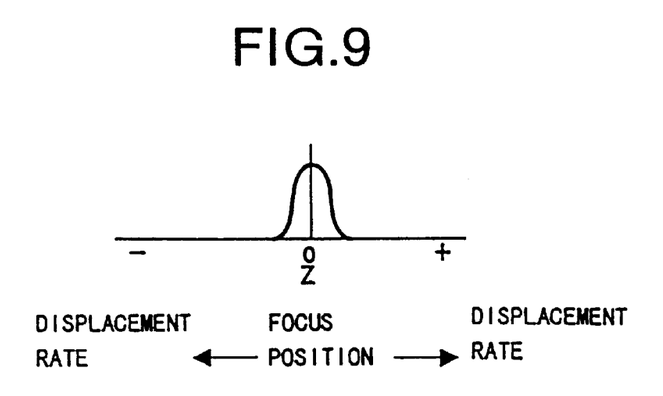
FIG. 9 is a graph showing the focusing degree characteristics in focus positioning by using a focus positioning device for a laser beam machining apparatus according to the present invention.

Because of the feature described above, as shown in FIG. 9, the focusing degree (the ratio c) shown by a meter 34 shows a more acute peak at the focus position as compared to the example based on the conventional technology (see FIG. 17), so that focus positioning with high precision can easily be executed with visual checking of a value of the meter 34.

Figure 10:
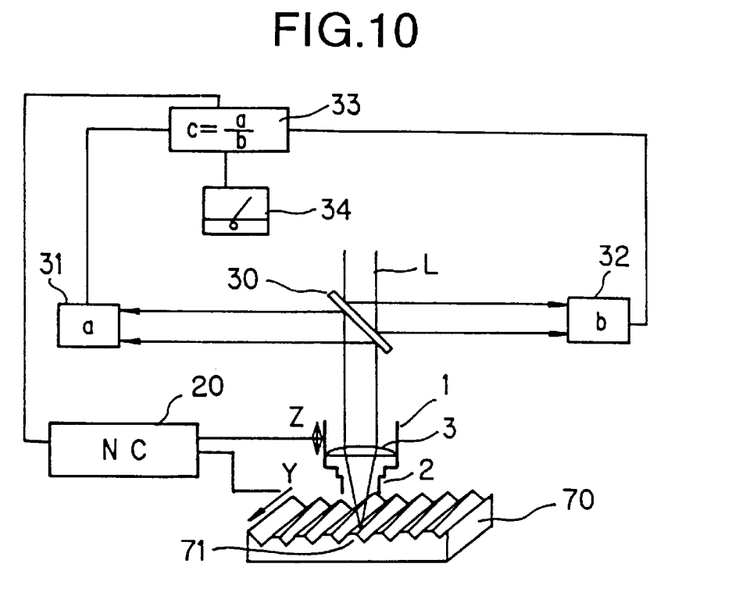
FIG. 10 is a block diagram showing configuration of a laser beam diameter measuring apparatus using a laser beam diameter measuring device for a laser beam machining apparatus according to one embodiment of the present invention.

FIG. 10 shows a laser beam diameter measuring apparatus using a laser beam diameter measuring device for a laser beam machining apparatus according to one embodiment of the present invention. It should be noted that, also in FIG. 10, the same reference numerals as those used in FIG. 15 are assigned to portions corresponding to those in FIG. 15, and description thereof is omitted herein.

A laser beam diameter measuring device 70 is made from a highly reflective reflecting material such as metal with silver color, and is placed on a surface for loading a work instead of the work when a focus positioning operation is to be executed.

As well shown in FIG. 11, the laser beam diameter measuring device 70 comprises at least one projecting stripe 71 extended in the Y-axial direction with a cross-sectional form like a trapezoid and also with width of its vertex t continuously and linearly changing. The width of the vertex t is adequately wider than a laser beam diameter at the focus position in one end of the projecting stripe 71 in the Y-axial direction and adequately narrower than the laser beam diameter at the focus position in the other end of the projecting stripe 71 in the Y-axial direction.

Next description is made for an operation for measuring a laser beam diameter by using the laser beam diameter measuring device 70.

1) At first, the laser beam diameter measuring device 70 is loaded on a specified surface for loading a work. At this point of time, correlation between the width t of the vertex of the projecting stripe 71 and the position in the Y-axial direction is previously stored in an NC device 20.

2) Next, a center of the area irradiated by the laser beam L and the focus position are matched to the vertex of the projecting stripe 61 of the focus positioning device 60, the laser beam diameter measuring device 70 is moved in the Y-axial direction to the nozzle 2, namely irradiation of the laser beam L is scanned at the vertex, and during the movement in the Y-axial direction a ratio c of an output a from the first laser intensity sensor 31 vs. an output b from the second laser intensity sensor 32 (c=a/b) is computed by the divider 33 to obtain a focusing degree (a ratio c).

Figure 12:
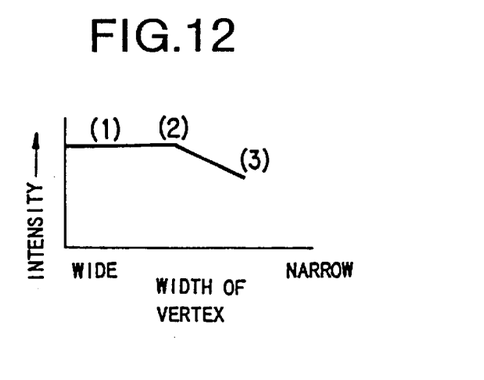
FIG. 12 is a graph showing laser beam intensity characteristics in laser beam diameter measurement by using a laser beam diameter measuring device for a laser beam machining apparatus according to the present invention.

When a laser beam is irradiated to a vertex of the projecting stripe 71 in the focused state, while the laser beam is irradiated onto an area between a section where the width of the vertex t is larger than a diameter of the converged laser beam and a section where the width of the vertex t is equal to the diameter of the converged laser beam as shown in FIG. 11 (1), intensity of the reflecting beam is not changed as shown in FIG. 12 (1) and (2), and when the laser beam is irradiated onto a section where the width of the vertex t is smaller than the laser beam diameter 9, even if the width is only slightly smaller than the laser beam diameter, intensity of the reflecting beam is acutely reduced as compared to that of the laser beam irradiated to the section where the width of the vertex t is equal to the laser beam diameter, as shown in FIG. 12 (2) and (3).

Because of the feature described above, measurement of a diameter of a laser beam can be executed with high precision and without wasting a sampling material such as acrylic resin by obtaining width t of the vertex in the Y-axial direction where intensity of the reflected laser beam begins decreasing from the data stored in the NC device 20.

As understood from the description above, with the laser beam machining apparatus according to the present invention, a work is held between an upper work holding member and a lower fixed base at a position adjacent to a laser beam machining position, so that the work is not bent due to pressure of an injected assist gas even if the work is an extremely thin plate, and a focus position on the work is not changed while the converged state of a laser beam on the work is maintained in good conditions, which enables to execute minute machining stably with high precision. Also, it is possible to execute a focus positioning operation without having a contact-type displacement meter removed from and attached to a laser machining head, whereby the time required for preparation and adjustment for the focus positioning operation can be shortened.

With the laser beam machining apparatus according to another feature of the invention, a throughhole provided at a position irradiated by a laser beam on the lower fixed base is a tapered throughhole widening in a direction opposite to a side irradiated by the laser beam, so that the assist gas passing through a cut groove during the operation for cutting machining does not give any interference to an internal wall of the throughhole, which reduces generation of dross produced from a melted material that has not been removed by the assist gas and is remaining thereon and the cutting quality is improved.

With the laser beam machining apparatus according to another feature of the invention, the assist gas blown against a laser beam machining section flows out to the outside from a slit, which makes it possible to inject an assist gas to a work under stable conditions, and a quantity of generated dross is reduced with the cutting quality improved. Also, it is possible to have a work such as an extremely thin plate stably contacted to the lower fixed base without being affected by pressure of an assist gas, so that a focus position does not change and minute machining can be executed with high precision under stable conditions.

With the laser beam machining apparatus according to another feature of the invention, a surface of at least either one of the upper work holding member and the lower fixed base, said face opposite to the work, is made from a surface material with high slipperiness, so that movement of the work is executed with low frictional resistance not giving any scratch to the work, and thus it is possible to execute minute machining stably with high precision.

With the laser beam machining apparatus according to another feature of the invention, the work can rotate and change its position because of rotation of the rotary driver base, so that a moving area for the driver base at laser beam machining can be reduced to be a small area, which enables to minimize the apparatus.

With the laser beam machining apparatus according to another feature of the invention, a pair of winding/extending tension rollers gives a tensile force with specified strength to the work between the rollers and moves the work by means of synchronous driving in the axial direction, so that a moving area for the driver base at laser beam machining can be reduced to be a small area, which enables to minimize the apparatus.

With a focus positioning device for a laser beam machining apparatus according to another feature of the present invention, a change of a reflected beam for displacement from the focus position becomes larger by executing focus positioning at a vertex of a projecting stripe, so that focus positioning with high precision can easily be executed, and as a result it is possible to stably execute minute laser beam machining by means of this focus positioning.

With a converged laser beam diameter measuring device for a laser beam machining apparatus according to another feature of the present invention, irradiation of a laser beam is scanned on a vertex of the projecting stripe when the laser beam is focused at the vertex and the laser beam diameter is measured by checking changes of reflecting beam intensity in the step, so that measurement of the laser beam diameter with high precision can be executed and as a result it is possible to stably execute minute laser beam machining according to a result of the measurement.

This application is based on Japanese patent application No. HEI 9-148342 filed in the Japanese Patent Office on Jun. 5, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A laser beam machining apparatus, comprising:
a driver base for supporting a work giving the work a tensile force and moving the work in a horizontal direction;
a laser machining head, having an optical converging element for a laser beam, movable in a vertical direction in which the laser beam is focused on the work;
an upper work holding member having a nozzle for irradiating the laser beam;
a hollow telescopic contact member for connecting said laser machining head and said upper work holding member, wherein said laser machining head and said upper work holding member are movable relative to each other in the vertical direction; and
a lower fixed base fixed at a position corresponding to a central position of said nozzle;
wherein the work is held between said upper work holding member and said lower fixed base at a position adjacent to a laser machining position.

2. A laser beam machining apparatus according to claim 1, wherein a tapered through-hole, widening in a direction opposite to a side irradiated by the laser beam, is provided at a position irradiated by the laser beam on said lower fixed base.

3. A laser beam machining apparatus according to claim 1, wherein said upper work holding member has a cylindrical form and a slit for exhausting an assist gas.

4. A laser beam machining apparatus according to claim 1, wherein a surface of at least one of said upper work holding member and said lower fixed base, said surface facing to a work, is made from a surface material with high slipperiness.

5. A laser machining apparatus according to claim 1, wherein said driver base includes a rotary driver base.

6. A laser beam machining apparatus according to claim 1, wherein said driver base includes a pair of tension rollers for creating a tensile force of predetermined strength to the work to move the work in the horizontal direction.

* * * * *